(12) United States Patent  
Domen et al.

(10) Patent No.: US 10,914,013 B2
(45) Date of Patent: Feb. 9, 2021

(54) PHOTOCATALYST ELECTRODE FOR OXYGEN GENERATION AND MODULE

(71) Applicants: FUJIFILM Corporation, Tokyo (JP); Japan Technological Research Association of Artificial Photosynthetic Chemical Process, Tokyo (JP); THE UNIVERSITY OF TOKYO, Tokyo (JP)

(72) Inventors: Kazunari Domen, Tokyo (JP); Tsutomu Minegishi, Tokyo (JP); Atsushi Ohnishi, Tokyo (JP); Koichiro Ueda, Tokyo (JP); Chisato Katayama, Tokyo (JP); Hiroyuki Kobayashi, Tokyo (JP)

(73) Assignees: FUJIFILM Corporation, Tokyo (JP); JAPAN TECHNOLOGICAL RESEARCH ASSOCIATION OF ARTIFICIAL PHOTOSYNTHETIC CHEMICAL PROCESS, Tokyo (JP); THE UNIVERSITY OF TOKYO, Tokyo (JP)

(*) Notice: Subject to any disclaimer, the term of this patent is extended or adjusted under 35 U.S.C. 154(b) by 350 days.

(21) Appl. No.: 15/914,731

(22) Filed: Mar. 7, 2018

(65) Prior Publication Data
US 2018/0195187 A1 Jul. 12, 2018

Related U.S. Application Data

(63) Continuation of application No. PCT/JP2016/076126, filed on Sep. 6, 2016.

(30) Foreign Application Priority Data

Sep. 8, 2015 (JP) ................................ 2015-176579

(51) Int. Cl.
 C25B 11/04 (2006.01)
 C25B 1/04 (2006.01)
 (Continued)

(52) U.S. Cl.
 CPC .......... *C25B 11/0405* (2013.01); *C25B 1/003* (2013.01); *C25B 1/04* (2013.01);
 (Continued)

(58) Field of Classification Search
 CPC ..... C25B 1/003; C25B 1/04–12; C25B 11/04; C25B 11/0405; C25B 11/0442;
 (Continued)

(56) References Cited

U.S. PATENT DOCUMENTS

2007/0292744 A1 12/2007 Lopez et al.
2013/0168228 A1* 7/2013 Ozin ...................... B01J 23/08
  204/157.9

(Continued)

FOREIGN PATENT DOCUMENTS

JP 2-200790 A 8/1990
JP 2005-133174 A 5/2005
 (Continued)

OTHER PUBLICATIONS

Tilley et al ("Light-Induced Water Splitting with Hematite: Improved Nanostructure and Iridium Oxide Catalysis", Angewandte Chemie, vol. 49, issue 36, pp. 6405-6408, 2010). (Year: 2010).*
(Continued)

*Primary Examiner* — Alexander W Keeling
(74) *Attorney, Agent, or Firm* — Birch, Stewart, Kolasch & Birch, LLP (57) ABSTRACT

Provided are a photocatalyst electrode for oxygen generation exhibiting a satisfactory onset potential, and a module including this photocatalyst electrode. The photocatalyst electrode for oxygen generation includes a current collector
(Continued)

layer; a photocatalyst on the current collector layer; and a promoter supported on at least a portion of the photocatalyst, in which the promoter contains a first metal oxide having an oxygen generation overvoltage of 0.4 V or lower, and a second metal oxide having an oxygen generation overvoltage of higher than 0.4 V.

15 Claims, 2 Drawing Sheets

(51) Int. Cl.
    *C25B 1/00*     (2006.01)
    *C25B 9/06*     (2006.01)

(52) U.S. Cl.
    CPC ............ *C25B 9/06* (2013.01); *C25B 11/0452* (2013.01); *Y02E 60/36* (2013.01)

(58) Field of Classification Search
    CPC ............ C25B 11/0447; C25B 11/0452; C25B 11/0478–0494; B01J 35/004
    See application file for complete search history.

(56) References Cited

U.S. PATENT DOCUMENTS

2014/0374270 A1* 12/2014 Minegishi .............. C01B 3/042
    205/340
2016/0076159 A1     3/2016 Huang et al.

FOREIGN PATENT DOCUMENTS

| JP | 2007-514520 A | 6/2007 | |
|---|---|---|---|
| JP | 2009-52069 A | 3/2009 | |
| JP | 2013-230427 A | 11/2013 | |
| JP | 2014-233669 A | 12/2014 | |
| WO | WO-2013133338 A1 * | 9/2013 | ............ C23C 14/34 |

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/076126, dated Mar. 22, 2018, with an English translation.
International Search Report and English translation (Form PCT/ISA/210) for Application No. PCT/JP2016/076126, dated Nov. 15, 2016.

* cited by examiner

PHOTOCATALYST ELECTRODE FOR OXYGEN GENERATION AND MODULE

CROSS-REFERENCE TO RELATED APPLICATIONS

This application is a Continuation of PCT International Application No. PCT/JP2016/076126 filed on Sep. 6, 2016, which claims priority under 35 U.S.C. § 119(a) to Japanese Patent Application No. 2015-176579 filed on Sep. 8, 2015. The above application is hereby expressly incorporated by reference, in its entirety, into the present application.

BACKGROUND OF THE INVENTION

1. Field of the Invention

The present invention relates to a photocatalyst electrode for oxygen generation and a module.

2. Description of the Related Art

From the viewpoints of carbon dioxide emission reduction and more use of clean energy, attention has been focused on technologies for producing hydrogen and oxygen by decomposing water by means of a photocatalyst by utilizing solar energy.

Extensive research has been conducted on such a water-splitting reaction utilizing a photocatalyst, and for example, effective utilization of visible light is under examination. Specifically, JP2013-230427A discloses a photocatalyst containing a metal oxide represented by $MO_x$ and a metal M as a promoter supported on an oxynitride containing Ti and/or Nb (claim 1).

SUMMARY OF THE INVENTION

In recent years, it is requested that water splitting be carried out more efficiently, and there is a demand for further improvements in connection with the characteristics of photocatalyst electrodes.

Particularly, satisfactory onset potential is very important for a module having photocatalyst electrodes. Specifically, in regard to the photocatalyst electrode on the oxygen production side (hereinafter, also referred to as "photocatalyst electrode for oxygen generation") among the photocatalyst electrodes, it is required that the onset potential is closer to the base side (in this case, 0VRHE side).

That is, water splitting by a two-electrode water splitting module is operated at a point where the splitting efficiency of the hydrogen generating electrode matches the splitting efficiency of the oxygen generating electrode. Therefore, increasing the splitting efficiency on the side with deteriorated performance leads to an enhancement of the performance of the module itself.

Generally, the performance of the oxygen generating electrode is deteriorated in many cases. Therefore, in order to enhance the performance of the oxygen generating electrode, it is desired that the photocurrent density is increased, and that the onset potential is adjusted to be closer to the base side, that is, the onset potential of the oxygen generating electrode is adjusted to be closer to the base side than the onset potential of the hydrogen generating electrode.

Here, it is known that a promoter is supported on a photocatalyst, in order to enhance the oxygen production ability of a photocatalyst that is used in a photocatalyst electrode. However, depending on the characteristics of the promoter that is supported on the photocatalyst, the original capability of the photocatalyst cannot be sufficiently extracted, and the oxygen generating electrode may have a low onset potential.

Thus, it is an object of the invention to provide a photocatalyst electrode for oxygen generation, which exhibits a satisfactory onset potential, and a module comprising this photocatalyst electrode for oxygen generation.

The inventors of the invention conducted a thorough investigation on the problems described above, and as a result, the inventors found that a satisfactory onset potential is obtained by using a promoter containing a first metal oxide having an oxygen generation overvoltage of 0.4 V or lower and a second metal oxide having an oxygen generation overvoltage of higher than 0.4 V, thus completing the invention.

That is, the present inventors found that the problems described above can be solved by the following configurations.

[1] A photocatalyst electrode for oxygen generation, comprising:
a current collector layer;
a photocatalyst on the current collector layer; and
a promoter supported on at least a portion of the photocatalyst,
wherein the promoter contains a first metal oxide having an oxygen generation overvoltage of 0.4 V or lower and a second metal oxide having an oxygen generation overvoltage of higher than 0.4 V.

[2] The photocatalyst electrode for oxygen generation according to [1], wherein at least a portion of the surface of the second metal oxide is covered with the first metal oxide.

[3] The photocatalyst electrode for oxygen generation according to [1] or [2], wherein the second metal oxide is formed on the photocatalyst, and the first metal oxide is formed on the second metal oxide.

[4] The photocatalyst electrode for oxygen generation according to any one of [1] to [3], wherein the second metal oxide contains two or more kinds of metal oxides having different oxygen generation overvoltages, and the two or more kinds of metal oxides are laminated on the photocatalyst side in order from the metal oxide having a higher oxygen generation overvoltage.

[5] The photocatalyst electrode for oxygen generation according to any one of [1] to [4], wherein the first metal oxide includes at least one selected from the group consisting of ruthenium oxide, iridium oxide, cobalt iron composite oxide, rhodium oxide, nickel iron composite oxide, and platinum oxide.

[6] The photocatalyst electrode for oxygen generation according to any one of [1] to [5], wherein the second metal oxide includes at least one selected from the group consisting of cobalt oxide, iron oxide, and nickel oxide.

[7] The photocatalyst electrode for oxygen generation according to any one of [1] to [6], wherein the second metal oxide includes at least one of cobalt oxide or iron oxide, and the first metal oxide includes at least one selected from the group consisting of ruthenium oxide, iridium oxide and cobalt iron composite oxide.

[8] The photocatalyst electrode for oxygen generation according to any one of [1] to [7], wherein in a case in which the molar amount of the metal species included in the first metal oxide is designated as M1, and the molar amount of the metal species included in the second metal oxide is designated as M2, the ratio M1/M2 is 0.01 to 10.

[9] The photocatalyst electrode for oxygen generation according to any one of [1] to [8], wherein the photocatalyst is a transition metal compound.

[10] The photocatalyst electrode for oxygen generation according to [9], wherein the transition metal compound includes at least one transition metal species selected from the group consisting of Ti, Ta, Nb, W, and La.

[11] The photocatalyst electrode for oxygen generation according to [9] or [10], wherein in a case in which the molar amount of the metal species included in the first metal oxide is designated as M1, and the molar amount of the transition metal species included in the transition metal compound is designated as M3, the ratio M1/M3 is 0.001 to 0.3.

[12] The photocatalyst electrode for oxygen generation according to [9] or [10], wherein in a case in which the molar amount of the metal species included in the second metal oxide is designated as M2, and the molar amount of the transition metal species included in the transition metal compound is designated as M3, the ratio M2/M3 is 0.001 to 0.3.

[13] A module comprising the photocatalyst electrode for oxygen generation according to any one of [1] to [12].

As will be described below, according to the invention, a photocatalyst electrode for oxygen generation exhibiting a satisfactory onset potential, and a module comprising this photocatalyst electrode can be provided.

DESCRIPTION OF THE PREFERRED EMBODIMENTS

In the following description, the photocatalyst electrode for oxygen generation of the invention (hereinafter, simply referred to as "oxygen generating electrode") and a module comprising this (hereinafter, simply referred to as "module") will be explained.

Meanwhile, a numerical value range indicated using the symbol "~" in the invention means a range including the numerical values described before and after the symbol "~" as the lower limit and the upper limit.

[Oxygen Generating Electrode]

The oxygen generating electrode of the invention comprises a current collector layer; a photocatalyst on the current collector layer; and a promoter supported in at least a portion of the photocatalyst, and the promoter contains a first metal oxide having an oxygen generation overvoltage of 0.4 V or lower and a second metal oxide having an oxygen generation overvoltage of higher than 0.4 V. The oxygen generating electrode of the invention is suitable for water splitting.

Here, the oxygen generation overvoltage in an electrochemical reaction refers to the difference between the theoretical potential of the reaction that is thermodynamically determined (equilibrium electrode potential) and the potential of the electrode at the time when the reaction actually proceeds.

According to the invention, in a case in which a promoter containing a first metal oxide having an oxygen generation overvoltage of 0.4 V or lower and a second metal oxide having an oxygen generation overvoltage of higher than 0.4 V is used, an oxygen generating electrode having this promoter exhibits a satisfactory onset potential.

It is believed that in a case in which a metal oxide having a low oxygen generation overvoltage is used as a promoter, a high photocurrent density is obtained, and this leads to an improvement in the onset potential. However, the inventors conducted an investigation, and it was found that merely by using a metal oxide having a low oxygen generation overvoltage as a promoter, the oxygen generating electrode acquires a low onset potential.

Thus, the inventors further conducted investigations in order to improve the onset potential of the oxygen generating electrode, and it was found that by using a metal oxide having a low oxygen generation overvoltage (specifically, a first metal oxide having an oxygen generation overvoltage of 0.4 V or lower) and a metal oxide having a high oxygen generation overvoltage (specifically, a second metal oxide having an oxygen generation overvoltage of higher than 0.4 V) in combination as promoters, a satisfactory value of the onset potential of an oxygen generating electrode containing these compounds is obtained.

The details of the reasons for this are not known; however, it is speculated to be because the first metal oxide has low oxygen generation overvoltage (that is, the oxygen production capability is expected to be high) while having insufficient adhesiveness (wettability) to the photocatalyst, whereas the second metal oxide has higher adhesiveness to the photocatalyst. That is, it is contemplated that since the first metal oxide having low adhesiveness to the photocatalyst is satisfactorily supported on the photocatalyst by means of the second metal oxide having high adhesiveness to the photocatalyst, the characteristics of the first metal oxide are effectively manifested. It is speculated that thereby the superior effects possessed by the first metal oxide for improving the onset potential are sufficiently exhibited.

Figure 1:
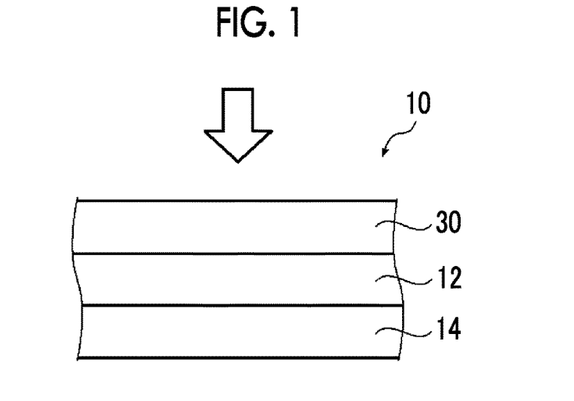
FIG. 1 is a cross-sectional view of an electrode schematically illustrating a photocatalyst electrode for oxygen generation according to an embodiment of the invention.

FIG. 1 discloses a cross-sectional view of the oxygen generating electrode according to an embodiment of the invention. As illustrated in FIG. 1, the oxygen generating electrode 10 includes a current collector layer 14, a photocatalyst 12, and a promoter 30. In the oxygen generating electrode 10, electrons produced by the photocatalyst 12 as a result of light irradiation flow to the current collector layer 14. Meanwhile, holes produced by the photocatalyst 12 react with water by way of the promoter 30, and thus oxygen is produced.

Usually, the oxygen generating electrode 10 is irradiated with light in the direction of the outline arrow in many cases, and in that case, the surface of the photocatalyst 12 on the opposite side of the current collector layer 14 becomes a light-receiving surface.

Figure 2:
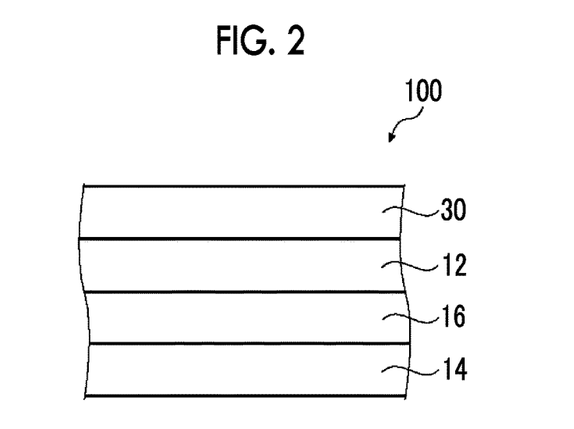
FIG. 2 is a cross-sectional view of an electrode schematically illustrating the photocatalyst electrode for oxygen generation according to another embodiment of the invention.

In the aspect of FIG. 1, the photocatalyst 12 is formed on the current collector layer 14; however, as illustrated in FIG. 2 as another embodiment of the oxygen generating electrode, an oxygen generating electrode 100 may further include a contact layer 16. Specifically, as illustrated in FIG. 2, the oxygen generating electrode 100 has a contact layer 16 between the photocatalyst 12 and the current collector layer 14.

Hereinafter, the various members that constitute the oxygen generating electrode will be described in detail.

<Photocatalyst>

The photocatalyst is disposed on one surface of the current collector layer that will be described below. The photocatalyst may be formed on at least a portion of one surface of the current collector layer.

The photocatalyst may constitute a photocatalyst layer that is disposed in a layer form, on the current collector layer. Here, the photocatalyst layer also includes a form in which a plurality of photocatalyst particles exist continuously on a current collector layer, and a form in which a plurality of photocatalyst particles exist non-continuously on the current collector layer.

It is preferable that the photocatalyst is a transition metal compound, and in this case, the transition metal compound, which can include a non-transition metal species.

Specific examples of the photocatalyst include:

oxides such as $TiO_2$, $WO_3$, $BiWO_6$, $Bi_2MoO_6$, $In_2O_3$ $(ZnO)_3$, $PbBi_2Nb_2O_9$, $BiVO_4$, $Ag_3VO_4$, $AgLi_{1/3}Ti_{2/3}O_2$, and $AgLi_{1/3}Sn_{2/3}O_2$, and products obtained by doping these oxides with at least one dopant selected from Cr, Ni, Sb, Nb, Th, and Rh;

oxynitride compounds such as $LaTiO_2N$, $CaNbO_2N$, $BaNbO_2N$, $SrNbO_2N$, $LaNbO_2N$, $TaON$, $CaTaO_2N$, $SrTaO_2N$, $BaTaO_2N$, $LaTaO_2N$, $Y_2Ta_2O_5N_2$, $Zr_{1+x}GeN_2O_x$, and $Ga_{1-x}Zn_xN_{1-x}O_x$;

nitride compounds such as $Ta_3N_5$, GaN, and $Ge_3N_4$, and compounds obtained by doping these nitride compounds with at least one dopant selected from Mg and Zr;

oxysulfide compounds such as $Sm_2Ti_2O_5S_2$ and $La_5Ti_2AgS_5O_7$;

oxyselenide compounds such as $La_5Ti_2AgSe_5O_7$; and chalcogenide compounds in which S and Se are incorporated at arbitrary proportions, such as $La_5Ti_2Cu(S_x, Se_{1-x})_5O_7$ and $La_5Ti_2Ag(S_x, Se_{1-x})_5O_7$.

It is preferable that the photocatalyst is a transition metal compound containing at least one transition metal species selected from the group consisting of Ti, Ta, Nb, W, and La.

It is preferable that the material that constitutes the photocatalyst is a visible light-responsive photocatalyst; more preferably an oxynitride compound, a nitride compound, an oxysulfide compound, or an oxyselenide compound; and even more preferably an oxynitride compound, a nitride compound, or an oxysulfide compound.

Here, in a case in which an oxynitride compound is used as the material that constitutes the photocatalyst, the onset potential of the oxygen generating electrode tends to become low, compared to the case of using an oxide. However, according to the invention, even in a case in which an oxynitride compound is used, the onset potential can be improved by the action of the promoter containing a first metal oxide and a second metal oxide. Therefore, an oxynitride compound can be preferably used from the viewpoint that the effects of the invention are conspicuously exhibited.

The photocatalyst can be synthesized by a conventionally known method.

Among them, the photocatalyst is preferably TaON, $Ta_3N_5$, $LaTiO_2N$, $BaNbO_2N$, $BaTaO_2N$, or $CaTaO_2N$; and more preferably $BaNbO_2N$ or $BaTaO_2N$. These photocatalysts may also be doped with other metals.

The shape of the photocatalyst is not particularly limited, and examples include a pillar shape, a particulate shape, and a flat plate shape.

In a case in which the photocatalyst has a particulate shape, the average particle size of the primary particles of the photocatalyst particles is not particularly limited; however, from the viewpoint of having high photoelectric conversion efficiency, the lower limit is preferably 1 nm or more, more preferably 10 nm or more, and even more preferably 50 nm or more. The upper limit is preferably 500 μm or less, more preferably 300 μm or less, even more preferably 200 μm or less, particularly preferably 100 μm or less, and most preferably 50 μm or less.

Here, the primary particles refer to the particles of the smallest unit that constitutes a powder, and the average particle size is a value obtained by measuring the particle sizes (diameters) of any arbitrary 100 photocatalyst particles observed by transmission electron microscopy (TEM) or scanning electron microscopy (SEM) and calculating the arithmetic average of the particle sizes. Meanwhile, in a case in which the particle shape is not a true circular shape, the major axis is measured. In a case in which the particle shape is irregular (non-spherical), the diameter of a sphere obtained by spherical approximation is measured.

Regarding TEM, an apparatus equivalent to a transmission electron microscope, "JEM-2010HC" (trade name, manufactured by JEOL Ltd.), can be used. Regarding SEM, an apparatus equivalent to an ultra-high resolution field emission type scanning electron microscope, "SU8010" (trade name, manufactured by Hitachi High-Technologies Corporation), can be used.

In a case in which the photocatalyst has a pillar shape, the photocatalyst is preferably a pillar-shaped photosemiconductor extending along a direction normal to the surface of a support (for example, current collector layer). The diameter of the pillar-shaped photosemiconductor is not particularly limited; however, usually, the diameter is preferably 25 nm or larger, and more preferably 50 nm or larger, and usually, the diameter is preferably 20 μm or less, and more preferably 10 μm or less.

In a case in which the photocatalyst is in a layered form, the thickness is not particularly limited; however, from the viewpoint of having superior water splitting efficiency, the thickness is preferably 0.01 to 3.0 μm, and more preferably 0.5 to 2.0 μm.

<Current Collector Layer>

The current collector layer has a role of releasing electrons that have been produced by the photocatalyst. As will be described below, the photocatalyst that will be described below is formed on the current collector layer.

The shape of the current collector layer is not particularly limited, and for example, the shape may be a perforated metal sheet shape, a mesh shape, a lattice shape, or a porous body having through-pores.

The material that constitutes the current collector layer is not particularly limited as long as it is a material exhibiting electroconductive characteristics, and examples include simple metals, alloys thereof, and oxides, nitrides or oxynitrides of the metals, and carbon (C).

Specific examples of the material that constitutes the current collector layer include metals such as Au, Al, Cu, Cd, Co, Cr, Fe, Ga, Ge, Hg, Ir, In, Mn, Mo, Nb, Ni, Pb, Pd, Pt, Ru, Re, Rh, Sb, Sn, Ta, Ti, V, W, and Zn, and alloys thereof; oxides such as $TiO_2$, ZnO, $SnO_2$, Indium Tin Oxide (ITO), SnO, $TiO_2$(:Nb), $SrTiO_3$(:Nb), fluorine-doped tin oxide (FTO), $CuAlO_2$, $CuGaO_2$, $CuInO_2$, ZnO(:Al), ZnO(:Ga), and ZnO(:In); nitrides such as TiN, GaN, GaN(:C), GaN(:Si), and GaN(:Sn); oxynitrides such as TaON; and C.

According to the present specification, in the case of having a description of $\alpha(:\beta)$, it implies that a is doped with β. For example, $TiO_2$(:Nb) represents $TiO_2$ doped with Nb.

Above all, in a case in which the current collector layer is formed from a metal or an alloy thereof, it is preferable that the metal is Ti or Sn, from the viewpoint that the material in the current collector layer does not easily undergo oxidation, the electroconductive characteristics are more effectively maintained, and the material is inexpensive and has appropriate hardness.

The resistance value of the current collector layer is not particularly limited; however, from the viewpoint that the characteristics (photocurrent density) of the oxygen generating electrode are superior, the resistance value is preferably 10.0Ω/□ or less, and more preferably 6.0Ω/□ or less. The lower limit is not particularly limited; however, the lower limit is preferably 0.01Ω/□ or more.

Regarding the method for measuring the resistance value of the current collector layer, the resistance value of a current collector layer formed on a glass substrate is measured using a four-terminal four-probe method (LORESTA GP MCP-T610 manufactured by Mitsubishi Chemical Analytech Co., Ltd., probe PSP).

The thickness of the current collector layer is not particularly limited; however, from the viewpoint of a balance between the electroconductive characteristics and the cost, the thickness is preferably 0.1 μm to 10 mm, and more preferably 1 μm to 2 mm.

<Contact Layer>

A contact layer is a layer containing a semiconductor or a good conductor. The contact layer is characterized in that by selecting and using a metal that has Ohmic junctions, the contact layer prevents the occurrence of the Schottky barrier, or even in a case in which the Schottky barrier occurs, reduces the occurrence, and the contact layer allows rapidly implementation of electron conduction.

Meanwhile, the contact layer may also have a role as a strength reinforcing layer for the current collector layer, in addition to the characteristics described above.

The contact layer is an optional layer that may be disposed between the photocatalyst and the current collector layer.

Regarding the semiconductor or good conductor, it is preferable to use a material which exhibits satisfactory electrical conductivity and does not catalyze a reverse reaction of the water-splitting reaction (specifically, a reaction that consumes oxygen at the oxygen generating electrode) and a reaction that counteracts the water-splitting reaction of the photocatalyst (specifically, a reaction that generates hydrogen at the oxygen generating electrode, or a reaction that includes an electrolyte solution).

Examples of the material that constitutes the contact layer include metals such as Au, Al, Cu, Cd, Co, Cr, Fe, Ga, Ge, Hg, Ir, In, Mn, Mo, Nb, Ni, Pb, Pd, Pt, Ru, Re, Rh, Sb, Sn, Ta, Ti, V, W, and Zn, and alloys thereof; nitrides such as TiN, $Ta_3N_5$, GaN, GaN(:C), GaN(:Si), and GaN(:Sn); oxynitrides such as TaON; $TiO_2$, ZnO, $SnO_2$, Indium Tin Oxide (ITO), SnO, $TiO_2$(:Nb), $SrTiO_3$(:Nb), fluorine-doped tin oxide (FTO), $CuAlO_2$, $CuGaO_2$, $CuInO_2$, ZnO(:Al), ZnO(:Ga), and ZnO(:In); and C.

Among them, the material that constitutes the contact layer is preferably a metal; more preferably Ta, Zr, Nb, Mo, or Ti; and even more preferably Ta, Zr, or Nb.

The thickness of the contact layer is not particularly limited; however, the thickness is preferably 10 nm or larger, more preferably 50 nm or larger, and even more preferably 150 nm or larger. Furthermore, the upper limit is preferably 1 mm or less, more preferably 2 μm or less, even more preferably 800 nm or less, and particularly preferably 700 nm or less.

<Promoter>

In the oxygen generating electrode of the invention, the promoter is supported on at least a portion of the photocatalyst. The promoter contains a first metal oxide having an oxygen generation overvoltage of 0.4 V or lower and a second metal oxide having an oxygen generation overvoltage of higher than 0.4 V. It is desirable that the promoter exists on at least a portion of the surface of the photocatalyst.

The promoter may be in a form that exists in layers on the photocatalyst, or may be in the form that exists non-continuously on the photocatalyst (for example, island-like form).

In regard to the oxygen generating electrode of the invention, it is preferable that at least a portion of the surface of the second metal oxide, which is a component of the promoter supported on the photocatalyst, is covered with the first metal oxide. It is preferable that the second metal oxide is in contact with the photocatalyst, and in the surface of the second metal oxide, at least a portion of the surface that is not in contact with the photocatalyst is covered with the first metal oxide. Thereby, the first metal oxide is supported on the photocatalyst more satisfactorily by means of the second metal oxide, and therefore, the effect of improving the onset potential by the first metal oxide is exhibited more satisfactorily.

Figure 3:
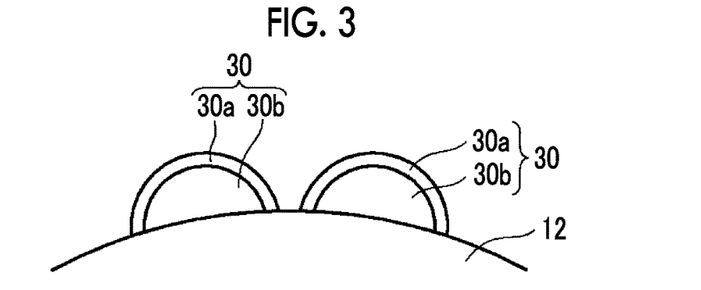
FIG. 3 is a partial cross-sectional view of an electrode schematically illustrating a promoter for the photocatalyst electrode for oxygen generation according to an embodiment of the invention.

Such a form will be specifically explained using FIG. 3. In FIG. 3, a second metal oxide 30b is formed on a photocatalyst 12, and a first metal oxide 30a is formed on the second metal oxide 30b. As such, as the photocatalyst 12, the second metal oxide 30b, and the first metal oxide 30a are laminated in this order, the oxygen generating electrode exhibits a more satisfactory onset potential.

A promoter 30 that includes the first metal oxide 30a and the second metal oxide 30b exists on at least a portion of the surface of the photocatalyst 12. More specifically, the second metal oxide 30b exists in contact with a portion of the surface of the photocatalyst 12, and the surface that is not in contact with the photocatalyst 12 in the surface of the second metal oxide 30b is covered with the first metal oxide 30a.

In the example of FIG. 3, the second metal oxide 30b exists only on a portion of the surface of the photocatalyst 12; however, the second metal oxide 30b may exist over the entire surface of the photocatalyst 12. Furthermore, the first metal oxide 30a covers the entire surface that is not in contact with the photocatalyst 12 in the surface of the second metal oxide 30b; however, it is also acceptable that the first metal oxide 30a covers a portion of the surface that is not in contact with the photocatalyst 12 in the surface of the second metal oxide 30b.

Particularly, an aspect in which the second metal oxide 30b exists only on a portion of the surface of the photocatalyst 12, and the first metal oxide 30a exists only on a portion of the surface of the second metal oxide 30b, is preferred.

The first metal oxide 30a may also exist on the surface of the photocatalyst 12, without having the second metal oxide 30b interposed therebetween.

In regard to the oxygen generating electrode of the invention, it is preferable that the second metal oxide contains two or more kinds of metal oxides having different oxygen generation overvoltages, and the two or more kinds of metal oxides are laminated on the photocatalyst side in order from the metal oxide having a higher oxygen generation overvoltage. Thereby, the oxygen generating electrode exhibits a more satisfactory onset potential.

Figure 4:
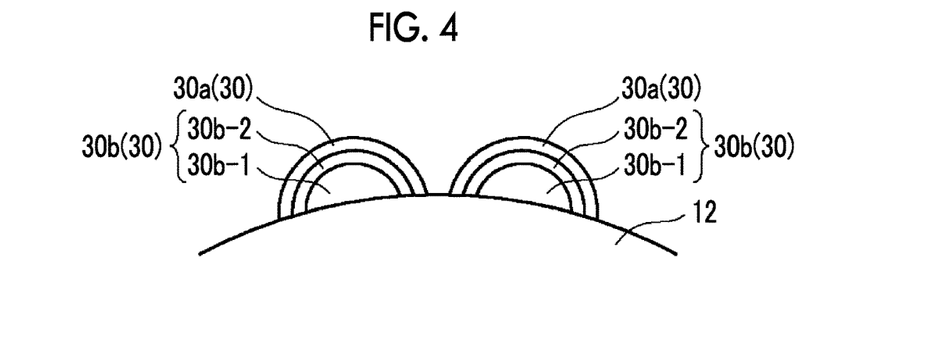
FIG. 4 is a partial cross-sectional view of an electrode schematically illustrating a promoter for the photocatalyst electrode for oxygen generation according to another embodiment of the invention.

An example of such an embodiment will be specifically explained using FIG. 4.

As illustrated in FIG. 4, the second metal oxide 30b has a second metal oxide layer 30b-1 and a second metal oxide layer 30b-2. The second metal oxide layer 30b-1 is formed on at least a portion of the surface of the photocatalyst 12, and the second metal oxide layer 30b-2 is formed so as to cover the surface of the second metal oxide layer 30b-1. Here, the oxygen generation overvoltage of the second metal oxide layer 30b-1 is higher than the oxygen generation overvoltage of the second metal oxide layer 30b-2.

Furthermore, the first metal oxide 30a is formed so as to cover at least a portion of the surface of the second metal oxide layer 30b-2.

In the example of FIG. 4, the second metal oxide 30b (second metal oxide layer 30b-1) exists only on a portion of the surface of the photocatalyst 12; however, the second metal oxide 30b may exist over the entire surface of the photocatalyst 12. Furthermore, the first metal oxide 30a covers the entire surface that is not in contact with the photocatalyst 12 in the surface of the second metal oxide 30b (second metal oxide layer 30b-2); however, the first metal oxide 30a may cover only a portion of the surface that is not in contact with the photocatalyst 12 in the surface of the second metal oxide 30b.

Particularly, an aspect in which the second metal oxide 30b exists only a portion of the surface of the photocatalyst 12, and the first metal oxide 30a exists only on a portion of the surface of the second metal oxide 30b, is preferred.

Meanwhile, the first metal oxide 30a may exist on the surface of the photocatalyst 12 without having the second metal oxide 30b interposed therebetween.

As the first metal oxide, a metal oxide having an oxygen generation overvoltage of 0.4 V or lower is used. The lower limit of the oxygen generation overvoltage of the first metal oxide is not particularly limited, and the lower limit is generally 0.1 V or higher.

It is preferable that the first metal oxide includes at least one selected from the group consisting of, specifically, ruthenium oxide (RuOx), iridium oxide (IrOx), cobalt iron composite oxide (CoFeOx), rhodium oxide (RhOx), nickel iron composite oxide (NiFeOx), and platinum oxide (PtOx), and from the viewpoint of having a lower oxygen generation overvoltage and from the viewpoint of cost, it is more preferable that the first metal oxide includes at least one selected from the group consisting of iridium oxide (IrOx), ruthenium oxide (RuOx), cobalt iron composite oxide (CoFeOx), and nickel iron composite oxide (NiFeOx). It is even more preferable that the first metal oxide includes at least one of iridium oxide (IrOx) or ruthenium oxide (RuOx), and it is particularly preferable that the first metal oxide is iridium oxide (IrOx).

The first metal oxide may be a mixture or an alloy of the oxides described above.

As the second metal oxide, a metal oxide having an oxygen generation overvoltage of higher than 0.4 V is used. The upper limit of the second metal oxide is not particularly limited.

It is preferable that the second metal oxide includes at least one selected from the group consisting of, specifically, cobalt oxide (CoOx), iron oxide (FeOx), and nickel oxide (NiOx), and from the viewpoint of having a lower oxygen generation overvoltage, it is more preferable that the second metal oxide includes cobalt oxide (CoOx).

A preferred combination of the first metal oxide and the second metal oxide is an aspect in which the second metal oxide includes at least one of cobalt oxide or iron oxide, and the first metal oxide includes at least one selected from the group consisting of ruthenium oxide, iridium oxide, and cobalt iron composite oxide. A more preferred combination is an aspect in which the second metal oxide is cobalt oxide, and the first metal oxide is ruthenium oxide or iridium oxide. In this case, the effect of improving the onset potential is more satisfactorily exhibited.

Here, according to the invention, the oxygen generation overvoltage of a metal oxide refers to the voltage value measured as follows. A working electrode is prepared by fixing the above-mentioned metal oxide on the surface of a substrate (indium tin oxide (ITO)), a Pt ring is used as a counter electrode, a saturated calomel electrode is used as a reference electrode, and the oxygen generation overvoltage is measured by a rotating disk electrode voltammetry (RDEV) method. In a case in which potential sweeping is implemented at a speed of rotation of the electrode of 1,600 rpm and a speed of sweeping of 0.01 V/s in a 1 M NaOH solution in an oxygen saturation state, the electric potential at which the current value reaches 10 mA/cm$^2$ is determined, and the voltage value obtainable after maintaining this electric potential for 2 hours is designated as the oxygen generation overvoltage. The measurement temperature is set to room temperature (23° C.).

The difference between the oxygen generation overvoltage of the first metal oxide and the oxygen generation overvoltage of the second metal oxide ((oxygen generation overvoltage of second metal oxide)−(oxygen generation overvoltage of first metal oxide)) is preferably 0.05 V or higher.

In a case in which the molar amount of the metal species included in the first metal oxide is designated as M1, and the molar amount of the metal species included in the second metal oxide is designated as M2, the ratio M1/M2 is preferably 0.01 to 10, and more preferably 0.5 to 2. As the ratio M1/M2 is within this range, the effect of improving the onset potential tends to be exhibited more satisfactorily.

The molar amount mentioned above is measured using an apparatus equivalent to ICPS-8100 (product name, manufactured by Shimadzu Corporation), the measurement principle of which is based on an ICP emission analysis method (high-frequency inductively coupled plasma emission analysis method). Specifically, the first metal oxide, the second metal oxide, and the photocatalyst that are included in the oxygen generating electrode of the invention are dissolved in an adequate solubilizing liquid (hydrochloric acid, nitric acid, hydrofluoric acid, or the like), that solution is dissolved using an adequate solubilizing liquid (for example, hydrochloric acid, nitric acid, or hydrofluoric acid), and quantitative measurement is performed.

In a case in which the photocatalyst is a transition metal compound, in a case in which the molar amount of the metal species included in the first metal oxide is designated as M1, and the molar amount of the transition metal species included in the transition metal compound is designated as M3, the ratio M1/M3 is preferably 0.001 to 0.3, and more preferably 0.01 to 0.1. As the ratio M1/M3 is within this range, the effect of improving the onset potential tends to be exhibited more satisfactorily.

The method for measuring M1 and M3 is similar to the method for measuring M1 and M2, except that the transition metal compound is used as the object of measurement instead of the second metal oxide.

In a case in which the photocatalyst is a transition metal compound, in a case in which the molar amount of the metal species included in the second metal oxide is designated as M2, and the molar amount of the transition metal species included in the transition metal compound is designated as M3, the ratio M2/M3 is preferably 0.001 to 0.3, and more preferably 0.05 to 0.2. As the ratio M2/M3 is within this range, the effect of improving the onset potential tends to be exhibited more satisfactorily.

The method for measuring M2 and M3 is similar to the method for measuring M1 and M2, except that the transition metal compound is used as the object of measurement instead of the first metal oxide.

The thickness of the first metal oxide is preferably 0.5 to 10 nm, and more preferably 0.5 to 2 nm.

The thickness of the second metal oxide is preferably 0.5 to 10 nm, and more preferably 0.5 to 2 nm.

<Other Layers>

The oxygen generating electrode of the invention may have another layer in addition to the layers described above. For example, in a case in which the oxygen generating electrode is produced by a particle transfer method that will be described below, the oxygen generating electrode may have a base material (corresponding to the second base material that will be described below) in order to reinforce the mechanical strength of the electrode, on a surface of the current collector layer, the surface being on the opposite side of the photocatalyst. The oxygen generating electrode may also have an adhesive layer between the current collector layer and the base material.

Regarding the second base material, for example, a quartz plate, a glass plate, a Ti plate, and a Cu plate can be used.

[Method for Producing Oxygen Generating Electrode]

The method for producing an oxygen generating electrode of the invention is not particularly limited, and any method capable of producing an oxygen generating electrode of the aspect described above will be acceptable. However, from the viewpoint of having superior characteristics (photocurrent density and dark current) of the oxygen generating electrode thus formed, it is preferable that the method includes the production process that will be explained below using FIGS. 5A to 5E). FIGS. 5A to 5E illustrate parts of the processes included in the method for producing an oxygen generating electrode 100; however, the method for producing the oxygen generating electrode 100 essentially further includes a process for forming a promoter that will be described below but is not illustrated in FIGS. 5A to 5E. Furthermore, FIGS. 5A to 5E illustrate the case of providing a contact layer 16; however, in a case in which the contact layer 16 is not provided, Step B (contact layer forming step) that will be described below may be omitted.

FIGS. 5A to 5E are outline diagrams for explaining the process for producing an oxygen generating electrode of the invention.

The production method illustrated in FIGS. 5A to 5E includes at least Step S1 of forming a photocatalyst; Step S2 of forming a contact layer including a semiconductor or a good conductor on one surface of the photocatalyst; and Step S3 of forming a current collector layer on the surface of the contact layer on the opposite side of the photocatalyst layer.

The process for production of an oxygen generating electrode of the invention essentially includes Step S5 of forming a promoter, which is not illustrated in FIGS. 5A to 5E.

The method for producing an oxygen generating electrode of the invention may include a metal wire adhesion step and an epoxy resin coating step, which will be described below. It is preferable that these steps are carried out before or after the step of forming a promoter.

The method for producing an oxygen generating electrode of the invention may carry out Step S4 of removing non-contacted photocatalyst, after the Step S3. In regard to Step S4, it is preferable that a reinforcing base material forming Step S4a or a washing Step S4c is included.

(Step S1: Photocatalyst Forming Step)

Step S1 is a step of forming a photocatalyst (photocatalyst layer). The method for forming a photocatalyst is not particularly limited; however, for example, a method of forming a photocatalyst through kneading of photocatalyst particles with a binder and pressure molding, or a method of laminating a photocatalyst on a first base material may be used. Particularly, a method of forming a photocatalyst (photocatalyst layer) by laminating on a first base material is preferred because a firm layer can be formed without using a binder, and impurities are not easily incorporated between the photocatalyst and the contact layer (or current collector layer).

Figure 5A:
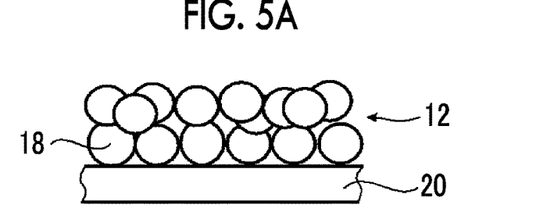
FIG. 5A is a schematic cross-sectional view illustrating a portion of the process for the method for producing a photocatalyst electrode for oxygen generation of the invention.

In FIGS. 5A to 5E, an aspect of using the first base material will be described in detail. More specifically, in the present process, as illustrated in FIG. 5A, a photocatalyst 12 is formed on a first base material 20. The photocatalyst 12 contains photocatalyst particles 18.

Regarding the first base material used in the present process, it is preferable to select a material that is inert to a reaction with the photocatalyst and has superior chemical stability and heat resistance, and for example, a glass plate, a Ti plate, or a Cu plate is preferred.

The surface of the first base material on which the photocatalyst is disposed may be subjected to a polishing treatment and/or a washing treatment.

The method for forming a photocatalyst is not particularly limited; however, for example, the formation can be carried out by dispersing photocatalyst particles in a solvent to obtain a suspension, applying the suspension on the first base material, and drying the suspension as necessary.

Examples of the solvent in the suspension include water; alcohols such as methanol and ethanol; ketones such as acetone; and aromatics such as benzene, toluene, and xylene. In a case in which photocatalyst particles are dispersed in a solvent, the photocatalyst particles can be uniformly dispersed in a solvent by applying an ultrasonic treatment.

The method of applying the suspension on the first base material is not particularly limited, and examples include known methods such as a spraying method, a dipping method, a squeegee method, a doctor blade method, a spin coating method, a screen coating method, a roll coating method, and an inkjet method. A method of disposing a first base material on the bottom face of a container containing the suspension, settling photocatalyst particles on the first base material, and then wiping the solvent, may also be used.

Regarding the drying conditions after application, the temperature may be maintained at a temperature higher than or equal to the boiling point of the solvent, or heating may be performed to a temperature at which the solvent is volatilized in a short time period (for example, about 15° C. to 200° C.).

It is preferable that the photocatalyst does not include any other component such as a binder, so that the formation of conductive paths between the photocatalyst and the contact layer or the current collector layer is not inhibited. Particularly, it is preferable that a colored or insulative binder is not included.

(Step S2: Contact Layer Forming Step)

Figure 5B:
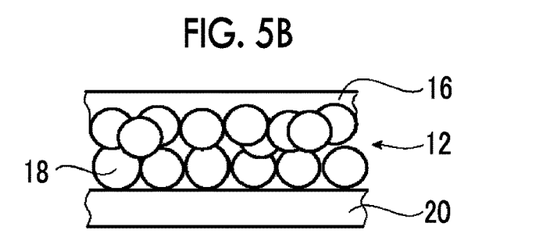
FIG. 5B is a schematic cross-sectional view illustrating a portion of the process for the method for producing a photocatalyst electrode for oxygen generation of the invention.

Step S2 is a step of forming a contact layer containing a semiconductor or a good conductor on a surface of the photocatalyst formed in Step S1, the surface being on the opposite side of the first base material. More specifically, in the present step, a contact layer 16 is formed on the photocatalyst 12, as illustrated in FIG. 5B.

Regarding the method for forming the contact layer, a vapor deposition method or a sputtering method is employed.

(Step S3: Current Collector Layer Forming Step)

Figure 5C:
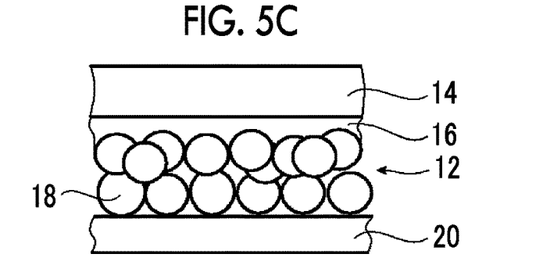
FIG. 5C is a schematic cross-sectional view illustrating a portion of the process for the method for producing a photocatalyst electrode for oxygen generation of the invention.

Step S3 is a step of forming a current collector layer on a surface of the contact layer formed in Step S2, the surface being on the opposite side of the photocatalyst layer side. More specifically, in the present step, as illustrated in FIG. 5C, the current collector layer 14 is formed on the contact layer 16.

Regarding the method of forming the current collector layer, a vapor deposition method or a sputtering method is employed.

(Step S4: Non-Contacted Photocatalyst Removing Step)

Step S4 is a step of removing photocatalyst particles that are not in contact with the contact layer. The removal method is not particularly limited; however, for example, washing Step S4c of removing the photocatalyst particles using a washing liquid for an ultrasonic washing treatment or the like is applicable.

Examples of the washing liquid include water, an electrolytic aqueous solution; alcohols such as methanol and ethanol; aliphatic hydrocarbons such as pentane and hexane; aromatic hydrocarbons such as toluene and xylene; ketones such as acetone and methyl ethyl ketone; esters such as ethyl acetate; halides such as fluorocarbons; ethers such as diethyl ether and tetrahydrofuran; sulfoxides such as dimethyl sulfoxide; and nitrogen-containing compounds such as dimethylformamide. Among them, water, or a water-miscible solvent such as methanol, ethanol or tetrahydrofuran is preferred.

Figure 5D:
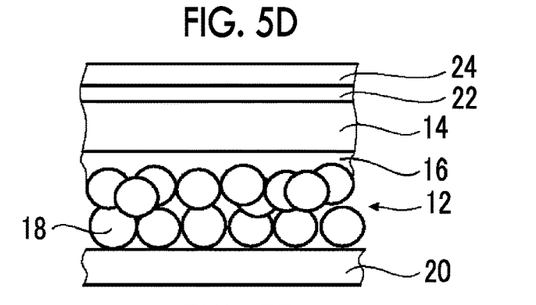
FIG. 5D is a schematic cross-sectional view illustrating a portion of the process for the method for producing a photocatalyst electrode for oxygen generation of the invention.

In a case in which the current collector layer has low mechanical strength, and there are concerns about damage of the oxygen generating electrode in Step S4, it is preferable to supply the oxygen generating electrode to the washing Step S4c after the oxygen generating electrode is subjected to reinforcing base material forming Step S4a, by which a second base material 24 is provided on a surface of the current collector layer 14, the surface being on the opposite side of the contact layer 16 side.

The method of providing a second base material is not particularly limited; however, for example, a method of adhering the current collector layer 14 and the second base material 24 using an adhesive such as a carbon tape may be mentioned. That is, as illustrated in FIG. 5D, the second base material 24 can be affixed to the surface of the current collector layer 14 on the opposite side of the contact layer 16 side, with an adhesive layer 22 being interposed therebetween.

Figure 5E:
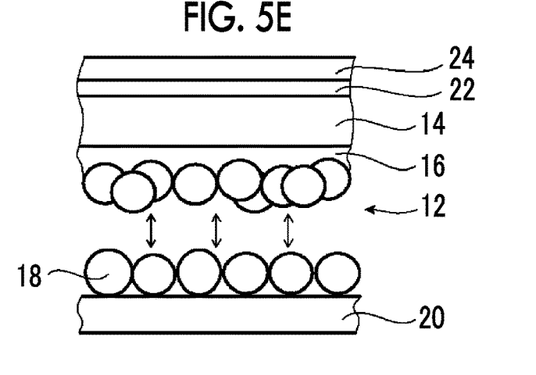
FIG. 5E is a schematic cross-sectional view illustrating a portion of the process for the method for producing a photocatalyst electrode for oxygen generation of the invention.

Furthermore, in Step S1 described above, in a case in which the photocatalyst particles are laminated on the first base material 20, after implementing the base material removing Step S4b of removing the first base material 20 (preferably, as illustrated in FIG. 5E, after implementing the base material removing Step S4b subsequently to the reinforcing base material forming Step S4a), it is preferable that the photocatalyst particles that are not in contact with the contact layer 16 are removed by the washing Step S4c.

There are no particular limitations on the method for removing the first base material 20, which is carried out in the base material removing Step S4b; however, for example, a method of mechanically removing the first base material 20; a method of immersing the first base material 20 in water to wet the photocatalyst particle lamination part, weakening the bonding between the photocatalyst particles, and thereby removing the first base material 20; a method of dissolving the first base material 20 with a chemical agent such as an acid or an alkali, and removing the first base material 20; a method of physically destroying the first base material 20 and removing the first base material 20; may be mentioned. However, from the viewpoint of having a low possibility for the damage of the photocatalyst, a method of detaching the first base material 20 is preferred. It is possible to physically remove the contact layer 16 and a portion of the non-contacted photocatalyst particles together with the first base material 20 (FIG. 5E) by means of the base material removing Step S4b.

Meanwhile, since the photocatalyst particles that are in contact with the contact layer 16 are physically bonded to the contact layer 16 strongly to a certain extent, even in a case in which the first base material 20 is removed, the photocatalyst particles remain on the contact layer 16 side without falling off. In this case, it is preferable that the non-contacted photocatalyst particles that could not be completely removed in the base material removing Step S4b are further subjected to a removal treatment by means of the washing Step S4c.

(Step S5: Promoter Forming Step)

The method for producing an oxygen generating electrode of the invention includes a promoter forming step (Step S5) of forming a promoter on the photocatalyst. An example of the promoter forming step will be disclosed below; however, the process is not limited to the following example, and any known method can be used.

The following promoter forming step may be carried out two or more times repeatedly. That is, after the second metal oxide is supported on the photocatalyst, the first metal oxide may be formed on the second metal oxide. In a case in which the second metal oxide has a laminated structure as described above, it is also acceptable that the second metal oxide layer 30b-1 (see FIG. 4 described above) is formed (supported) on the photocatalyst, and then the second metal oxide layer 30b-2 (see FIG. 4 described above) is formed on the second metal oxide layer 30b-1.

(Step S5a: Promoter Forming Step a)

Promoter forming step a (Step S5a) includes a treatment of bringing a solution containing a metal compound (compound containing a metal atom) that becomes a promoter (at least one of the first metal oxide or the second metal oxide described above) into contact with the photocatalyst. Thereby, a promoter is formed (supported) on the photocatalyst. After the treatment described above, a heating treatment may also be applied as necessary.

Specifically, the present step can be carried out by suspending, after the synthesis of the photocatalyst, the photocatalyst in a solution containing the metal compound of the promoter, and adsorbing the promoter metal species to the surface of the photocatalyst while gradually evaporating the solvent. Subsequently, the promoter can be fixed to the surface of the photocatalyst by performing a heating treatment. Thereby, the photocatalyst having the promoter supported thereon in advance can be laminated on the first base material.

According to the present step, there is an advantage that the amount of support of the promoter can be easily controlled. In this case, it is preferable that the heating treatment is applied in an atmosphere in which the photocatalyst included in the mixture is not oxidized.

A metal compound is a compound containing a metal atom, and this is a precursor of the promoter.

Regarding the metal compound, the type is not particularly limited as long as the metal compound is a compound containing a metal atom and can become a metal oxide or a metal atom. Examples thereof include salts containing metal atoms (for example, nitrates, carbonates, carboxylates, sulfates, phosphates, sulfonates, and borates), complexes containing metal atoms (for example, acetylacetonates, thiolates, thiocarboxylate complexes, ammine complexes, various amine complexes, porphyrin complexes, and various nitrile complexes), hydroxides, halides, oxides, and metals. Among them, nitrates or metal ammine complexes are preferred from the viewpoint of thermal degradability.

The method of mixing the photocatalyst with the metal compound is not particularly limited, and for example, a method of mixing a solution in which the photocatalyst is dispersed (suspension) with a solution containing the metal compound, or a method of adding the photocatalyst and the metal compound into a solvent and mixing the system, may be used.

(Step S5b: Promoter Forming Step b)

Regarding another aspect of the promoter forming step 5S, promoter forming step b (Step S5b) may be mentioned. The promoter forming step b includes at least an immersion treatment of immersing the laminate obtained through the above-described Steps S1 to S3 in a liquid containing the metal atoms that are included in the promoter.

The liquid containing the metal atoms that are included in the promoter may be an aqueous solution of a metal-ammine complex.

(Step S5c: Promoter Forming Step c)

Regarding another aspect of the promoter forming step 5S, promoter forming step c (Step S5c) may be mentioned. The promoter forming step c includes at least an electrodeposition treatment of immersing the laminate obtained through the above-described Steps S1 to S3 in an electrolyte solution containing the metal atoms that are included in the promoter and performing electrodeposition.

The electrodeposition treatment can be carried out by immersing the laminate in an electrolyte solution containing the metal atoms that are included in the promoter, for example, using a three-electrode system using a potentiostat. More specifically, a flat window-attached separable flask can be used as an electrochemical cell, and a saturated Ag/AgCl electrode can be used as a reference electrode, while a Pt wire can be used as a counter electrode. Regarding the electrolyte, for example, a solution obtained by dissolving cobalt nitrate in a potassium phosphate (KPi) buffer solution (an aqueous solution of boric acid is prepared and adjusted to pH=13.0 with KOH) may be mentioned. It is preferable that the interior of the electrochemical cell is filled with argon, and dissolved oxygen and carbon dioxide are removed by sufficiently performing bubbling. Thus, a promoter (first metal oxide and/or second metal oxide) is formed by maintaining a certain electric potential as such using a potentiostat.

It is preferable that the electrodeposition treatment (promoter forming step c) is carried out after the metal wire adhesion step and the epoxy resin coating step that will be described below.

The time for the electrodeposition treatment is not particularly limited and is set depending on the desired thickness of the promoter. Specifically, the electrodeposition time at the time of forming a promoter having a thickness of 50 nm is formed by electrodeposition is measured in advance, thereby the electrodeposition rate (electrodeposition time/film thickness) is calculated, and then the electrodeposition time is determined from the product of the "electrodeposition rate" and the "desired thickness of the promoter (intended film thickness of the promoter)".

(Step S5d: Promoter Forming Step d)

Regarding another aspect of the promoter forming step 5S, promoter forming step d (Step S5d) may be mentioned. Promoter forming step d includes a sputtering treatment of forming a film containing the metal atoms that are included in the promoter on the photocatalyst by a sputtering method, and an oxidation treatment of oxidizing the metal atoms included in the film that has been formed by this sputtering treatment.

The sputtering treatment can be carried out according to known conditions.

(Other Promoter Forming Steps)

The promoter forming step can also be carried out by a method of sublimating the metal compound described above and thereby supporting (vapor depositing) the metal compound on the photocatalyst.

A promoter containing the first metal oxide and the second metal oxide is formed on the photocatalyst by the promoter forming steps described above. Here, the promoter forming steps described above or the various treatments that are included in the promoter forming steps may be respectively carried out in combination. Specifically, a method of providing the second metal oxide on the photocatalyst by the immersion treatment that is included in the promoter forming step b, and then providing the first metal oxide by performing the promoter forming step d described above, may be mentioned. A method of providing the second metal oxide on the photocatalyst by the electrodeposition treatment that is included in the promoter forming step c, and then providing the first metal oxide by performing the promoter forming step d described above, may also be mentioned.

(Other Steps)

It is preferable that the method for producing an oxygen generating electrode of the invention includes a metal wire adhesion step and an epoxy resin coating step. These processes are carried out before or after the step of forming a promoter.

The metal wire adhesion step is a process of adhering a metal wire to the laminate described above, and for example, the metal wire can be soldered using indium metal. Regarding the metal wire, a resin coating film-attached metal wire may also be used.

The epoxy resin coating step is a process of coating the surface of the laminate other than the photocatalyst part with an epoxy resin in order to suppress leakage from exposed metal parts. Regarding the epoxy resin, known resins can be used.

[Module]

The module of the invention comprises the oxygen generating electrode described above.

A photocatalyst module is provided with, for example, a cell storing water; an oxygen generating electrode and a hydrogen generating electrode that are disposed so as to be immersed in the water inside the cell; and a voltage applying means connected to the oxygen generating electrode and the hydrogen generating electrode and applying a voltage to the oxygen generating electrode as an anode and to the hydrogen generating electrode as a cathode. The module of the invention is suitably used as a photocatalyst module for water splitting.

As the oxygen generating electrode is irradiated with light, water splitting proceeds, oxygen is generated on the surface of the oxygen generating electrode, and hydrogen is generated on the surface of the hydrogen generating electrode.

The light used for the irradiation may be any light capable of causing a photodecomposition reaction, and specifically, visible light such as solar light, ultraviolet radiation, infrared radiation, and the like can be utilized. Among them, solar light that is supplied in an inexhaustible amount is preferred.

EXAMPLES

Hereinafter, the oxygen generating electrode of the invention will be explained in detail using Examples. However, the invention is not intended to be limited to these.

Example 1

Synthesis Example 1: Synthesis of $BaTaO_2N$ Photocatalyst 0.88 g of tantalum oxide (manufactured by Kojundo Chemical Laboratory Co., Ltd.) and 0.79 g of barium carbonate (manufactured by Kanto Chemical Co., Inc.) were pulverized and mixed in an agate mortar, subsequently the mixture was introduced into a boat made of alumina, and the mixture was calcined for 10 hours at 1,000° C. in a box type electric furnace. Thus, an oxide precursor was obtained. This precursor was subjected to a nitriding treatment for 10 hours at 900° C. under a 100% ammonia gas stream (200 ml/min) in an electric tubular furnace. The powder thus obtained was crushed with an agate mortar. It was confirmed by X-ray diffraction (XRD) analysis that the powder thus obtained was barium tantalum oxynitride ($BaTaO_2N$). For the XRD analysis, an X-ray diffraction apparatus, "ULTIMA III" (trade name), manufactured by Rigaku Corporation was used, and the same apparatus was used also for the following Examples and Comparative Examples.

(Production of Laminate A)

The photocatalyst powder (photocatalyst particles) produced in Synthesis Example 1 described above was suspended in a low-boiling point organic solvent (solvent: ethanol), and thus a suspension was produced. The concentration of the photocatalyst powder ($BaTaO_2N$) in the suspension was 3.9% by mass.

Next, the suspension thus obtained was applied on a base material (quartz glass) and dried, and thereby, a photocatalyst layer-attached base material having a photocatalyst layer (thickness: 0.5 to 2.0 μm) disposed on a base material was produced.

On the photocatalyst layer of the photocatalyst layer-attached base material, a zirconium (Zr) layer (thickness 70 nm) that would serve as a contact layer was laminated by a sputtering method. For the apparatus, MPS-254 manufactured by Ulvac Technologies, Inc. was used, and the sputtering was performed at a film-forming rate of 28 nm/s.

Next, a titanium (Ti) layer (5.0 μm) that would serve as a current collector layer was laminated on the contact layer by a sputtering method. For the apparatus, MPS-254 manufactured by Ulvac Technologies, Inc. was used, and the sputtering was performed at a film-forming rate of 5 nm/s. Subsequently, a glass base material (soda lime glass) was adhered onto the current collector layer using a carbon tape. Subsequently, laminate A (laminate of photocatalyst layer/contact layer/current collector layer/carbon tape/glass base material (soda lime glass)) was detached from the base material (quartz glass) and was washed by ultrasonication for one hour in pure water. Thus, laminate A was obtained.

Then, a resin coating-attached metal wire was adhered to the current collector layer of the laminate A using indium solder, and then the metal exposed parts (contact layer and current collector layer) other than the photocatalyst layer were coated with an epoxy resin.

(Promoter Formation 1-1)

Subsequently, 10 mM $Co(NO_3)_3.6H_2O$ was dissolved in a mixed solution of 0.1 M-$K_2HPO_4$ and 0.1 M-$KH_2PO_4$ at pH 7, and the laminate A thus produced was immersed in this solution. In a three-electrode type electrochemical analysis method of using the laminate A as a working electrode, an Ag/AgCl electrode as a reference electrode, and a Pt wire as a counter electrode, 1.1 V (vs Ag/AgCl) was applied for 100 seconds, and thereby a cobalt oxide promoter (second metal oxide) was supported on the photocatalyst layer of the laminate A by an electrodeposition method. Subsequently, the laminate A was washed with distilled water.

(Promoter Formation 1-2)

Next, the laminate A thus obtained having a cobalt oxide promoter (second metal oxide) supported thereon was used, and an iridium oxide promoter (first metal oxide) was formed on the cobalt oxide promoter by a sputtering method.

For the apparatus, MSP-30T manufactured by Vacuum Device, Inc. was used.

Regarding film formation, metal Ir (iridium) was laminated under the conditions of a film-forming rate of 0.0625 nm/s such that a thickness of metal Ir of 2 nm would be obtained. The target size was 50 mmϕ, the current value was 50 mA, the argon pressure was 0.8 Pa, and the target/substrate distance (TS distance) was 75 mm.

Subsequently, the metal Ir thus formed was converted to iridium oxide (IrOx) by means of exposure to the atmosphere and application of voltage at the time of electrochemical analysis.

Thus, an oxygen generating electrode of Example 1 (IrOx/CoOx/$BaTaO_2N$/Zr/Ti/carbon tape/glass base material (soda lime glass)) was obtained.

Example 2

An oxygen generating electrode of Example 2 was produced according to a procedure similar to that of Example 1, except that the thickness of IrOx (first metal oxide) as a promoter was changed to 0.5 nm.

Example 3

An oxygen generating electrode of Example 3 was produced according to a procedure similar to that of Example 2, except that the electrodeposition time employed at the time of producing CoOx (second metal oxide) as a promoter was changed to 500 seconds.

Example 4

An oxygen generating electrode of Example 4 was produced according to a procedure similar to that of Example 2, except that the electrodeposition time employed at the time of producing CoOx (second metal oxide) as a promoter was changed to 1,000 seconds.

Example 5

Synthesis Example 2: $BaNbO_2N$ $NbCl_5$ (manufactured by Kojundo Chemical Laboratory Co., Ltd., 3 N, 2.93 g), $BaCO_3$ (manufactured by Kanto Chemical Co., Inc., 3 N, 2.68 g), citric acid (manufactured by Wako Pure Chemical Industries, Ltd., 23.5 g), ethylene glycol (manufactured by Wako Pure Chemical Industries, Ltd., special grade reagent, 30.3 g), and methanol (manufactured by Wako Pure Chemical Industries, Ltd., 99.5%, 39.1 g) were introduced into a beaker and mixed (Ba/Nb (molar ratio)=1.25), and the mixture was uniformly stirred on a hot stirrer. Thus, the mixture was subjected to complexation. Subsequently, the mixture thus obtained was heated for 3 hours at 350° C. with a mantle heater at 350° C., and thus the mixture was subjected to carbonization.

Next, the resultant was further heated for 5 hours at 500° C. on a boat made of alumina, and thus a white solid was obtained. The solid thus obtained was calcined for 2 hours at 700° C., and then was calcined for 3 hours at 800° C. It was confirmed by XRD that the solid thus obtained as $Ba_5Nb_4O_{15}$. The $Ba_5Nb_4O_{15}$ thus obtained was subjected to a nitriding treatment for 50 hours at 850° C. under a 100% ammonia gas stream (500 ml/min) in an electric tubular furnace. Subsequently, the surface of the product was washed with 1 M nitric acid, and thus barium niobium oxynitride ($BaNbO_2N$) was obtained.

It was confirmed by XRD that the product was barium niobium oxynitride. It was also confirmed from diffuse reflection spectrum measurement (manufactured by JASCO Inc., ultraviolet-visible-near-infrared spectrophotometer "V-670" (trade name)) that the absorption edge of barium niobium oxynitride was at 740 nm.

The ratio of Ba/Nb (molar ratio) is a ratio between the molar amount of barium atoms originating from $BaCO_3$ and the molar amount of niobium atoms originating from $NbCl_5$.

(Production of Laminate B)

A photocatalyst powder (photocatalyst particles) produced in Synthesis Example 2 was suspended in a low-boiling point organic solvent (solvent: isopropyl alcohol), and thus a suspension was produced. The concentration of the photocatalyst powder ($BaNbO_2N$) in the suspension was 1.92% by mass. Next, the suspension thus obtained was applied on a base material (float plate glass (FL glass)) and dried, and thus a photocatalyst layer-attached base material having a photocatalyst layer disposed on a base material was produced.

On the photocatalyst layer of the photocatalyst layer-attached base material, a titanium layer (Ti) (thickness 600 nm) that would serve as a contact layer was laminated by a vapor deposition method. For the apparatus, VPC-260F manufactured by Ulvac Technologies, Inc. was used, and the vapor deposition was performed at a film-forming rate of 5 nm/s.

Next, a tin layer (Sn) (4.4 μm) that would serve as a current collector layer was laminated on the contact layer by a vapor deposition method. For the apparatus, VPC-260F manufactured by Ulvac Technologies, Inc. was used, and the vapor deposition was performed at a film-forming rate of 5 nm/s.

Next, a glass base material (soda lime glass) was adhered on the current collector layer using a carbon tape. Subsequently, the base material (FL glass) was detached from laminate B (photocatalyst layer, contact layer, current collector layer, carbon tape, and glass base material (soda lime glass)), and the laminate was washed by ultrasonication for 10 minutes in pure water. Thus, laminate B was obtained.

The thickness of the photocatalyst layer in the laminate B obtained as described above was about 0.5 to 2.0 μm.

The resistance values of a titanium layer and a tin layer obtained in a case in which the metal layers were directly formed on a glass substrate under the same conditions as the vapor deposition conditions were 2.8Ω/□ and 0.4Ω/□, respectively.

Promoter Formation 5-1

10 ml each of a 20 mM aqueous solution of ammonia and a 20 mM aqueous solution of cobalt nitrate were mixed, and the pH of the mixture was adjusted to 8.5 with 28% aqueous ammonia. Thus, a cobalt-ammine complex solution was produced. The laminate B described above was immersed in the cobalt-ammine complex for 1 hour, washed with pure water, and then was dried. Thereby, a cobalt oxide promoter (second metal oxide) was formed (supported) on the photocatalyst of the laminate B.

(Promoter Formation 5-2)

The laminate B thus obtained having the cobalt oxide promoter (second metal oxide) supported thereon was used, and a ruthenium oxide promoter (RuOx, first metal oxide) was formed by a sputtering method. The ruthenium oxide promoter was formed (supported) by a method similar to that of Example 1, except that metal Ru (ruthenium) was laminated such that the thickness of metal Ru would be 8 nm.

Then, a resin coating-attached metal wire was adhered to the current collector layer of the laminate B having the promoter formed thereon, using indium solder. Subsequently, metal exposed parts (contact layer and current collector layer) other than the photocatalyst layer and the promoters were coated with an epoxy resin.

Thus, an oxygen generating electrode of Example 5 (RuOx/CoOx/$BaNbO_2N$/Ti/Sn/carbon tape/glass base material (soda lime glass)) was obtained.

Example 6

An oxygen generating electrode of Example 6 was produced according to a procedure similar to that of Example 5, except that the thickness of RuOx (first metal oxide) as a promoter was changed to 5 nm.

Example 7

An oxygen generating electrode of Example 7 was produced according to a procedure similar to that of Example 5, except that the thickness of RuOx (first metal oxide) as a promoter was changed to 10 nm.

Example 8

An oxygen generating electrode of Example 8 was produced in the same manner as in Example 1, except that the electrodeposition time of "Promoter formation 1-1" was changed to 50 seconds, and the procedure of "Promoter formation 1-2" was changed to the following "Promoter formation 8-2".

(Promoter Formation 8-2)

First, laminate A having a cobalt oxide promoter (second metal oxide) supported thereon was prepared (see "Promoter formation 1-1" of Example 1).

Subsequently, as a FeOx electrodeposition solution, a solution was produced by dissolving $Na_2SO_4$ in water and adjusting the concentration to 0.2 M. $FeSO_2 \cdot 7H_2O$ was added to that solution, and thus a $Fe^{2+}$ solution having a concentration of 1 mM was prepared. The $Fe^{2+}$ solution thus produced was introduced into a three-electrode glass cell having the laminate A as a working electrode, an Ag/AgCl electrode as a reference electrode, and a Pt wire as a counter electrode, and 1.4 V (vs Ag/AgCl) was applied thereto. Thus, FeOx was supported on CoOx (second metal oxide) of the laminate A by an electrodeposition method (formation of FeOx). The electrodeposition time was set to 1 second.

The laminate A having FeOx formed thereon was washed with distilled water, and then this was heated to 300° C. in a vacuum to thereby cause cobalt (Co) of CoOx and iron (Fe) of FeOx to react. Thus, a cobalt iron composite oxide (CoFeOx) (first metal oxide) was formed.

Thus, an oxygen generating electrode of Example 8 (CoFeOx/CoOx/$BaTaO_2N$/Zr/Ti/carbon tape/glass base material (soda lime glass)) was obtained.

Example 9

Synthesis Example 3: Synthesis of $Ta_3N_5$ Photocatalyst

The photocatalyst powder was produced by nitriding a precursor of oxide using a flux.

Specifically, first, as a precursor of oxide, a mixture of $Ta_2O_5$ mixed with $ZrO(NO_3)_2 \cdot 2H_2O$ and $Mg(NO_3)_2 \cdot 6H_2O$ was prepared, and a product obtained by calcining the mixture at 650° C. in an air atmosphere was prepared.

Next, the oxide precursor thus prepared was subjected to nitriding at 900° C. in a nitrogen gas atmosphere using $Na_2CO_3$ as flux, and thereby a $Ta_3N_5$:Mg+Zr powder was produced.

Here, the expression $Ta_3N_5$:Mg+Zr means that Ta atoms that constitute $Ta_3N_5$ are substituted by Mg and Zr. In the present Example, 25% of Ta atoms that constitute $Ta_3N_5$ were substituted at a ratio of Zr:Mg=2:1.

It was confirmed by XRD analysis that the powder thus obtained was tantalum nitride ($Ta_3N_5$), with a portion of Ta being substituted by Zr and Mg.

(Production of Laminate C)

The photocatalyst powder (photocatalyst particles) produced in Synthesis Example 3 described above was suspended in a low-boiling point organic solvent (solvent: ethanol), and thus a suspension was produced. The concentration of the photocatalyst powder ($Ta_3N_5$) in the suspension was 3.9% by mass.

Next, the suspension thus obtained was applied on a base material (quartz glass) and dried, and thereby a photocatalyst layer-attached base material having a photocatalyst layer (thickness: 0.5 to 2.0 μm) disposed on a base material was produced.

On the photocatalyst layer of the photocatalyst layer-attached base material, a niobium (Nb) layer (thickness 70 nm) that would serve as a contact layer was laminated by a sputtering method. For the apparatus, MPS-254 manufactured by Ulvac Technologies, Inc. was used, and the sputtering was performed at a film-forming rate of 28 nm/s.

Next, a titanium (Ti) layer (5.0 μm) that would serve as a current collector layer was laminated on the contact layer by a sputtering method. For the apparatus, MPS-254 manufactured by Ulvac Technologies, Inc. was used, and the sputtering was performed at a film-forming rate of 5 nm/s. Subsequently, a glass base material (soda lime glass) was adhered onto the current collector layer using a carbon tape. Subsequently, laminate A (laminate of photocatalyst layer/contact layer/current collector layer/carbon tape/glass base material (soda lime glass)) was detached from the base material (quartz glass) and was washed by ultrasonication for one hour in pure water. Thus, laminate C was obtained.

Then, a resin coating-attached metal wire was adhered to the current collector layer of laminate C using indium solder, and then metal exposed parts (contact layer and current collector layer) other than the photocatalyst layer were coated with an epoxy resin.

(Promoter Formation 9-1)

Subsequently, FeOx (corresponding to the second metal oxide layer 30b-1 in FIG. 4) was supported on the photocatalyst layer of laminate C by a electrodeposition method in the same manner as in the method for forming "FeOx" (electrodeposition method) in "Promoter formation 8-2", except that the applied voltage was changed to 1.2 V (vs Ag/AgCl), and the electrodeposition time was changed to 20 seconds. Subsequently, the resulting laminate was washed with distilled water.

(Promoter Formation 9-2)

Subsequently, 10 mM $Co(NO_3)_3 \cdot 6H_2O$ was dissolved in a mixed solution of 0.1 M-$K_2HPO_4$ and 0.1 M-$KH_2PO_4$ at pH 7, and the laminate C having FeOx supported on the photocatalyst layer was immersed in this solution. In a three-electrode type electrochemical analysis method of using this laminate C as a working electrode, an Ag/AgCl electrode as a reference electrode, and a Pt wire as a counter electrode, 1.1 V (vs Ag/AgCl) was applied, and thereby a cobalt oxide promoter (corresponding to the second metal oxide layer 30b-2 in FIG. 4) was supported on FeOx of the laminate C by an electrodeposition method. Subsequently, the resulting laminate was washed with distilled water.

The electrodeposition time was set to 50 seconds.

(Promoter Formation 9-3)

Next, the laminate C having a cobalt oxide promoter (corresponding to the second metal oxide layer 30b-2 in FIG. 4) supported thereon was used, and an iridium oxide promoter (first metal oxide) was formed on the cobalt oxide promoter by a sputtering method.

For the apparatus, MSP-30T manufactured by Vacuum Device, Inc. was used.

Regarding film formation, metal Ir (iridium) was laminated under the conditions of a film-forming rate of 0.0625 nm/s, such that the thickness of the metal Ir would be 2 nm. The target size was 50 mmϕ, the current value was 50 mA, the argon pressure was 0.8 Pa, and the target/substrate distance (TS distance) was 75 mm.

Subsequently, the metal Ir thus formed was converted to iridium oxide (IrOx) by means of exposure to the atmosphere and application of voltage at the time of electrochemical analysis.

Thus, an oxygen generating electrode of Example 9 (IrOx/CoOx/FeOx/$Ta_3N_5$/Nb/Ti/carbon tape/glass base material (soda lime glass)) was obtained.

Example 10

An oxygen generating electrode of Example 10 was produced in the same manner as in Example 1, except that the electrodeposition time of "Promoter formation 1-1" was changed to 50 seconds, and the "Promoter formation 1-2" was changed to an immersion method as follows.

Specifically, first, an IrOx colloid was produced by adding $HNO_3$ to a $[Ir(OH)_6]^{2-}$ solution and acidifying the mixture. Laminate A having a cobalt oxide promoter (second metal oxide) supported thereon was immersed in the above-mentioned solution for 3 seconds, and thus IrOx was supported on the surface of the cobalt oxide promoter. The laminate A at the time of taking out from the IrOx colloid solution was lightly dipped into distilled water, and thereby any colloid solution remaining on the surface was removed.

Thus, an oxygen generating electrode of Example 10 (IrOx/CoOx/BaTaO$_2$N/Zr/Ti/carbon tape/glass base material (soda lime glass)) was obtained.

Example 11

An oxygen generating electrode of Example 11 was produced in the same manner as in Example 1, except that the electrodeposition time of "Promoter formation 1-1" was changed to 50 seconds, and the "Promoter formation 1-2" was changed to an electrodeposition method as follows.

First, 50 ml of a 0.1 M NaOH solution was prepared, and a solution was obtained by adding 24.2 mg of $K_2IrCl_6$ thereto. The solution was heated for 20 minutes at 90° C.

The solution thus produced was introduced into a three-electrode glass cell employing the laminate A as a working electrode, an Ag/AgCl electrode as a reference electrode, and a Pt wire as a counter electrode, and 1.1 V (vs Ag/AgCl) was applied thereto. Thus, IrOx (first metal oxide) was supported on the second metal oxide of the laminate A by an electrodeposition method.

Electrodeposition was carried out by having an Ar atmosphere inside the cell and immersing the laminate A such that the conducting wire part would not be brought into contact with the electrodeposition liquid, while the system was stirred. The electrodeposition time was set to 150 seconds.

Thus, an oxygen generating electrode of Example 11 (IrOx/CoOx/BaTaO$_2$N/Zr/Ti/carbon tape/glass base material (soda lime glass)) was obtained.

Comparative Example 1

An oxygen generating electrode of Comparative Example 1 (CoOx/BaTaO$_2$N/Zr/Ti/carbon tape/glass base material (soda lime glass)) was produced according to a procedure similar to that of Example 1, except that the process of forming IrOx (first metal oxide) as a promoter was omitted.

Comparative Example 2

An oxygen generating electrode of Comparative Example 2 (IrOx/BaTaO$_2$N/Zr/Ti/carbon tape/glass base material (soda lime glass)) was produced according to a procedure similar to that of Example 2, except that the process of forming CoOx (second metal oxide) as a promoter was omitted.

Comparative Example 3

An oxygen generating electrode of Comparative Example 3 (CoOx/BaNbO$_2$N/Ti/Sn/carbon tape/glass base material (soda lime glass)) was produced according to a procedure similar to that of Example 5, except that the process of forming IrOx (first metal oxide) as a promoter was omitted.

Comparative Example 4

An oxygen generating electrode of Comparative Example 4 (RuOx/BaNbO$_2$N/Ti/Sn/carbon tape/glass base material (soda lime glass)) was produced according to a procedure similar to that of Example 5, except that the process of forming CoOx (second metal oxide) as a promoter was omitted.

Comparative Example 5

An oxygen generating electrode of Comparative Example 5 (IrOx/Ta$_3$N$_5$/Nb/Ti/carbon tape/glass base material (soda lime glass)) was produced according to a procedure similar to that of Example 9, except that the process of forming CoOx and FeOx (both second metal oxides) as a promoter was omitted.

Comparative Example 6

An oxygen generating electrode of Comparative Example 6 (IrOx/BaTaO$_2$N/Zr/Ti/carbon tape/glass base material (soda lime glass)) was produced according to a procedure similar to that of Example 10, except that the process of forming CoOx (second metal oxide) as a promoter was omitted.

Comparative Example 7

An oxygen generating electrode of Comparative Example 7 (IrOx/BaTaO$_2$N/Zr/Ti/carbon tape/glass base material (soda lime glass)) was produced according to a procedure similar to that of Example 11, except that the process of forming CoOx (second metal oxide) as a promoter was omitted.

<Evaluation of Electrode>
(Measurement of Onset Potential)

An evaluation of the onset potential of the oxygen generating electrodes thus produced was carried out based on the photocurrent density obtained by current-potential measurement with a three-electrode system using a potentiostat.

Specifically, a flat window-attached separable flask was used as an electrochemical cell, each of the oxygen generating electrodes of Examples and Comparative Examples was used as working electrode, an Ag/AgCl electrode was used as a reference electrode, and a Pt wire was used as a counter electrode.

Regarding the electrolyte, in Examples 1 to 4 and Comparative Examples 1 and 2, a 0.2 M potassium phosphate (KPi) buffer solution (pH=13) was used. In Examples 5 to 7 and Comparative Examples 3 to 4, a 0.1 M potassium borate (KBi) buffer solution (pH=9.3) was used. In Examples 8 and 10 to 11 and Comparative Examples 6 and 7, a 0.2 M sodium borate buffer solution (pH=13) was used. In Example 9 and Comparative Example 5, a 0.1 M sodium sulfate (pH=13) was used.

The interior of the electrochemical cell was filled with argon, and dissolved oxygen and carbon dioxide were removed by performing sufficient bubbling before measurement.

For the photoelectrochemical analysis, a solar simulator (AM1.5G) was used as a light source. For each of the electrodes, the measurement potential was varied between −0.1 V vs. RHE to 1.5 V vs. RHE, and the photocurrent density was measured. The potential obtained in a case in which the photocurrent density was 0.05 mA/cm$^2$ or higher was designated as onset potential. Meanwhile, RHE is an abbreviation of reversible hydrogen electrode.

(Evaluation Criteria)

In Examples 1 to 4 and 8 and Comparative Example 1, the onset potential of Comparative Example 2 was used as a reference; in Examples 5 to 7 and Comparative Example 3, the onset potential of Comparative Example 4 was used as a reference; in Example 9, the onset potential of Comparative Example 5 was used as a reference; in Example 10, the onset potential of Comparative Example 6 was used as a reference; in Example 11, the onset potential of Comparative Example 7 was used as a reference, and the oxygen generating electrodes were classified based on the following evaluation criteria. Regarding the evaluation criteria, grade C or higher is considered satisfactory, and A is the most preferable.

A: The onset potential has been improved by a value of 0.3 V vs. RHE or higher (shift toward the base side)
B: The onset potential has been improved by a value of 0.2 V vs. RHE or higher and lower than 0.3 V vs. RHE
C: The onset potential has been improved by a value of 0.15 V vs. RHE or higher and lower than 0.2 V vs. RHE
D: The improvement of the onset potential is lower than 0.15 vs. RHE (also including a shift toward the top side)

The evaluation results are presented in the following Table 1.

<Measurement of Molar Amount>

In regard to the oxygen generating electrode of Example 1, the molar amount (M1) of the metal species included in the first metal oxide, the molar amount (M2) of the metal species included in the second metal oxide, and the molar amount (M3) of the transition metal species of the transition metal compounds that constitute the photocatalyst were measured as follows.

In regard to the oxygen generating electrode of Example 2, the molar amount (M1) of the metal species included in the first metal oxide and the molar amount (M2) of the metal species included I the second metal oxide were measured as follows.

The various molar amounts described above were measured using ICPS-8100 (product name, manufactured by Shimadzu Corporation), the measurement principle of which is based on an ICP emission analysis method (high-frequency inductively coupled plasma emission analysis method). Specifically, the first metal oxide, the second metal oxide, and the photocatalyst included in each of the oxygen generating electrodes described above were dissolved in an appropriate solubilizing liquid (hydrochloric acid, nitric acid, or hydrofluoric acid), and quantitative measurement was performed.

TABLE 1

| | Promoter | | | Metal layer | | First metal oxide (thickness, electrodeposition time, or immersion time) | Second metal oxide (electrodeposition time or immersion time) | Evaluation results Onset potential |
|---|---|---|---|---|---|---|---|---|
| | First metal oxide | Second metal oxide | Photocatalyst | Contact layer | Current collector layer | | | |
| Example 1 | IrOx | CoOx | BaTaO$_2$N | Zr | Ti | 2.0 nm (sputter) | 100 seconds (electrodeposition) | A |
| Example 2 | IrOx | CoOx | BaTaO$_2$N | Zr | Ti | 0.5 nm (sputter) | 100 seconds (electrodeposition) | A |
| Example 3 | IrOx | CoOx | BaTaO$_2$N | Zr | Ti | 0.5 nm (sputter) | 500 seconds (electrodeposition) | A |
| Example 4 | IrOx | CoOx | BaTaO$_2$N | Zr | Ti | 0.5 nm (sputter) | 1000 seconds (electrodeposition) | C |
| Example 5 | RuOx | CoOx | BaNbO$_2$N | Ti | Sn | 8.0 nm (sputter) | 1 hour (immersion) | B |
| Example 6 | RuOx | CoOx | BaNbO$_2$N | Ti | Sn | 5.0 nm (sputter) | 1 hour (immersion) | C |
| Example 7 | RuOx | CoOx | BaNbO$_2$N | Ti | Sn | 10.0 nm (sputter) | 1 hour (immersion) | C |
| Example 8 | CoFeOx | CoOx | BaTaO$_2$N | Zr | Ti | 1 second (electrodeposition followed by heating) | 50 seconds (electrodeposition) | C |
| Example 9 | IrOx | CoOx/FeOx | Ta$_3$N$_5$ | Nb | Ti | 2.0 nm (sputter) | 50 seconds (CoOx)/20 seconds (FeOx) (both electrodeposition) | C |
| Example 10 | IrOx | CoOx | BaTaO$_2$N | Zr | Ti | 3 seconds (immersion) | 50 seconds (electrodeposition) | C |
| Example 11 | IrOx | CoOx | BaTaO$_2$N | Zr | Ti | 150 seconds (electrodeposition) | 50 seconds (electrodeposition) | C |
| Comparative Example 1 | — | CoOx | BaTaO$_2$N | Zr | Ti | — | 100 seconds (electrodeposition) | D |
| Comparative Example 2 | IrOx | — | BaTaO$_2$N | Zr | Ti | 0.5 nm (sputter) | — | — |
| Comparative Example 3 | — | CoOx | BaNbO$_2$N | Ti | Sn | — | 1 hour (immersion) | D |
| Comparative Example 4 | RuOx | — | BaNbO$_2$N | Ti | Sn | 8.0 nm (sputter) | — | — |
| Comparative Example 5 | IrOx | — | Ta$_3$N$_5$ | Nb | Ti | 2.0 nm (sputter) | — | — |
| Comparative Example 6 | IrOx | — | BaTaO$_2$N | Zr | Ti | 3 seconds (immersion) | — | — |
| Comparative Example 7 | IrOx | — | BaTaO$_2$N | Zr | Ti | 150 seconds (electrodeposition) | — | — |

The various molar ratios were calculated based on the measurement results. The results are presented below.

(Molar ratios in oxygen generating electrode of Example 1)

M1/M2=about 2
M1/M3=about 0.03
M2/M3=about 0.08

(Molar ratio in oxygen generating electrode of Example 2)

M1/M2=about 0.5

<Measurement of Oxygen Generation Overvoltage>

The oxygen generation overvoltages of the first metal oxide and the second metal oxide that constituted the promoters used in Examples and Comparative Examples were measured as follows.

First, as a working electrode, a product having the first metal oxide or the second metal oxide fixed onto the surface of a substrate (indium tin oxide (ITO)) was prepared, and a Pt ring was used as a counter electrode, while a saturated calomel electrode was used as a reference electrode. The oxygen generation overvoltage was measured by a rotating disk electrode voltammetry (RDEV) method. In a case in which potential sweeping was implemented at a speed of rotation of the electrode of 1,600 rpm and a speed of sweeping of 0.01 V/s in a 1 M NaOH solution in an oxygen saturation state, the electric potential at which the current value reached 10 mA/cm$^2$ was determined, and the voltage value obtainable after maintaining this electric potential for 2 hours was designated as the oxygen generation overvoltage. The measurement temperature was set to room temperature (23° C.).

The oxygen generation overvoltages of the various metal oxides are shown below.

IrOx: 0.32 V
RuOx: 0.25 V
CoFeOx: 0.36 V
CoOx: 0.42 V
FeOx: 0.43 V

As shown in the first table, it was found that all of the oxygen generating electrodes of Examples formed by using promoters including a first metal oxide and a second metal oxide, exhibited satisfactory onset potential values compared to the oxygen generating electrodes of Comparative Examples formed by using promoters that did not include a first metal oxide or a second metal oxide.

In regard to the various oxygen generating electrodes of Examples, cross-sections of the promoters and the photocatalysts were checked by TEM (transmission electron microscope) observation and a STEM-EDS (scanning transmission electron microscope-energy dispersive spectroscopy) analysis, using a transmission electron microscope (TITAN 80-300 type manufactured by FEI Company) at an accelerating voltage of 300 kV. As a result, it was confirmed that the second metal oxide was in contact with the photocatalyst, and at least a portion of the surface that was not in contact with the photocatalyst in the surface of the second metal oxide, was covered with the first metal oxide.

EXPLANATION OF REFERENCES 10, 100: oxygen generating electrode
12: photocatalyst
14: current collector layer
16: contact layer
18: photocatalyst particles
20: first base material
22: adhesive layer
24: second base material
30: promoter
30$a$: first metal oxide
30$b$: second metal oxide
30$b$-1, 30$b$-2: second metal oxide layer

What is claimed is:

1. A photocatalyst electrode for oxygen generation, comprising:
   a current collector layer;
   a photocatalyst on the current collector layer; and
   a promoter supported on at least a portion of the photocatalyst,
   wherein the promoter contains a first metal oxide having an oxygen generation overvoltage of 0.4 V or lower and a second metal oxide having an oxygen generation overvoltage of higher than 0.4 V,
   wherein the second metal oxide contains two or more kinds of metal oxides having different oxygen generation overvoltages, and the two or more kinds of metal oxides are laminated on the photocatalyst side in order from the metal oxide having a higher oxygen generation overvoltage.

2. The photocatalyst electrode for oxygen generation according to claim 1, wherein at least a portion of the surface of the second metal oxide is covered with the first metal oxide.

3. The photocatalyst electrode for oxygen generation according to claim 1, wherein the second metal oxide is formed on the photocatalyst, and the first metal oxide is formed on the second metal oxide.

4. The photocatalyst electrode for oxygen generation according to claim 1, wherein the first metal oxide includes at least one selected from the group consisting of ruthenium oxide, iridium oxide, cobalt iron composite oxide, rhodium oxide, nickel iron composite oxide, and platinum oxide.

5. The photocatalyst electrode for oxygen generation according to claim 1, wherein the second metal oxide includes at least one selected from the group consisting of cobalt oxide, iron oxide, and nickel oxide.

6. The photocatalyst electrode for oxygen generation according to claim 1, wherein the second metal oxide includes at least one of cobalt oxide or iron oxide, and the first metal oxide includes at least one selected from the group consisting of ruthenium oxide, iridium oxide, and cobalt iron composite oxide.

7. The photocatalyst electrode for oxygen generation according to claim 1, wherein in a case in which the molar amount of the metal species included in the first metal oxide is designated as M1, and the molar amount of the metal species included in the second metal oxide is designated as M2, the ratio M1/M2 is 0.01 to 10.

8. The photocatalyst electrode for oxygen generation according to claim 1, wherein the photocatalyst is a transition metal compound.

9. The photocatalyst electrode for oxygen generation according to claim 8, wherein the transition metal compound includes at least one transition metal species selected from the group consisting of Ti, Ta, Nb, W, and La.

10. The photocatalyst electrode for oxygen generation according to claim 8, wherein in a case in which the molar amount of the metal species included in the first metal oxide is designated as M1, and the molar amount of the transition metal species included in the transition metal compound is designated as M3, the ratio M1/M3 is 0.001 to 0.3.

11. The photocatalyst electrode for oxygen generation according to claim 8, wherein in a case in which the molar amount of the metal species included in the second metal oxide is designated as M2, and the molar amount of the transition metal species included in the transition metal compound is designated as M3, the ratio M2/M3 is 0.001 to 0.3.

12. A module comprising the photocatalyst electrode for oxygen generation according to claim 1.

13. The photocatalyst electrode for oxygen generation according to claim 2, wherein the second metal oxide is formed on the photocatalyst, and the first metal oxide is formed on the second metal oxide.

14. The photocatalyst electrode for oxygen generation according to claim 2, wherein the first metal oxide includes at least one selected from the group consisting of ruthenium oxide, iridium oxide, cobalt iron composite oxide, rhodium oxide, nickel iron composite oxide, and platinum oxide.

15. The photocatalyst electrode for oxygen generation according to claim 3, wherein the first metal oxide includes at least one selected from the group consisting of ruthenium oxide, iridium oxide, cobalt iron composite oxide, rhodium oxide, nickel iron composite oxide, and platinum oxide.

\* \* \* \* \*